Patented Oct. 24, 1944

2,361,188

UNITED STATES PATENT OFFICE 2,361,188

PREPARATION OF ORGANIC SULPHONAMIDES

Arthur L. Fox, Woodstown, N. J., assignor to E. I. du Pont de Nemours & Company, Wilmington, Del., a corporation of Delaware No Drawing. Application January 15, 1942, Serial No. 426,915

5 Claims. (Cl. 260—556)

This invention relates to the preparation of organic sulphonamides. More particularly it relates to the preparation of organic sulphonamides from the organic sulphonyl chloride reaction products obtained by reacting organic compounds, preferably saturated hydrocarbons, with a mixture of sulphur dioxide and chlorine under conditions conducive to the formation of organic sulphonyl chloride derivatives, e. g. after the manner set forth in U. S. Patents 2,046,090 and 2,202,791. Still more particularly it relates to the preparation of amides from polyamines and sulphonyl chloride mixtures obtainable in the manner just described, especially those which predominate in mono sulphonyl chlorides. The invention also relates to complex mixtures of sulphonamides as new products.

When a saturated hydrocarbon or a mixture of such hydrocarbons is reacted with a mixture of sulphur dioxide and chlorine at a temperature below the decomposition point of the formed organic sulphonyl chlorides under the influence of actinic light in the above-identified manner, a rather complex mixture of products is formed which contains hydrocarbon monosulphonyl chlorides, chlorhydrocarbon monosulphonyl chlorides, chlor-hydrocarbon polysulphonyl chlorides, hydrocarbon polysulphonyl chlorides and chlorohydrocarbons. Similar results are obtained with hydrocarbon derivatives. The proportion of products in the mixture can be varied somewhat by varying the proportions of sulphur dioxide to chlorine, the rate of flow, the intensity of the actinic light used to accelerate the reaction, pressure, and temperature conditions. If a large proportion of hydrocarbon is present or only a portion of the available hydrocarbon is reacted a large proportion of hydrocarbon monosulphonyl chlorides is formed. Some substitution, however, takes place whereby chlorhydrocarbon monosulphonyl chlorides are formed.

In the case where the saturated open chain hydrocarbons and derivatives thereof, e. g. non-gaseous n-alkanes, isoalkanes, chloroalkanes and mineral oil fractions free from aromatic and unsaturated constituents are used as initial reactants, the mixtures are usually complex since the sulphonyl chloride groups do not enter the same position in each molecule. Hence, the resulting sulphonamides are quite complex when the entire fraction or a portion thereof which consists essentially of hydrocarbon sulphonyl chlorides is used for the amide reaction.

This invention has for an object the preparation of new organic sulphonamides. A further object is the development of new processes for the preparation of organic sulphonamides. A further object is the preparation of sulphonamides from a cheap source of raw materials. A still further object is to prepare organic sulphonamides from polyamines and especially diamines and the organic sulphonyl chloride mixtures obtainable in the above described manner from saturated aliphatic non-gaseous hydrocarbons and sulphur dioxide and chlorine. Still other objects include the preparation of organic sulphonamides from polyamines in commercial quantities and a general advance in the art. Still other objects will appear hereinafter.

It has been found that polyamines and especially diamines can be reacted under amide-forming conditions with the hydrocarbon monosulphonyl chloride reaction products obtainable by reacting a saturated aliphatic hydrocarbon with admixed sulphur dioxide and chlorine as previously described thereby producing new and useful sulphonamides. The reaction is carried out in the substantial absence of water since the presence thereof has been found to be conducive to the formation of addition products or amine salts.

It has been found that by varying the proportion of sulphonamide-forming reactants, a product consisting preponderantly of, or substantially completely of, mono sulphonamides or of disulphonamides may be obtained. For instance, if it is desired to obtain an amide from a primary diamine which has a sulphonyl group on only one of the amino groups at least three mols of diamine should be used for each mol of sulphonyl chloride. At this ratio substantially no disulphonamides are formed which is unexpected and surprising.

On the other hand, if it is desired to produce a product consisting preponderantly of diamides, one to two mols of hydrocarbon sulphonyl chloride should be used per mol of primary diamine. In the case of polyamines containing more than two unsubstituted amino groups, e. g. tri and tetra amines, at least one mol of organic sulphonyl chloride should be used. An excess over that theoretically necessary to react with each amino group can be used.

The hydrocarbon sulphonyl chloride mixtures which consist essentially of mono sulphonyl chlorides prepared as disclosed herein, may be dissolved in a dry solvent such as benzene, toluene, ligroin, etc. and a polyamine such as ethylene diamine-1,2, or propylene diamine-1,3 passed in. The precipitated compounds may be filtered off and the hydrocarbon sulphonamides recovered by removing the solvent. This may be done by evaporating off the solvent, by removing the solvent by steam distillation or by extracting the sulphonamide from the solvent by an alkaline solution, e. g. caustic soda or caustic potash.

An alternative method of converting the above-described hydrocarbon sulphonyl chloride mixtures to hydrocarbon sulphonamides is to add the sulphonyl chloride directly to the liquid polyamine such as ethylene diamine-1,2; propylene diamine-1,3, etc. This operation may be efficiently carried out by providing the reaction zone with a cooling jacket or reflux means or both. After the reaction has gone to completion, the residual nitrogen base is allowed or caused to evaporate if it has a boiling point substantially below the boiling point of the sulphonamide. The amine salts can be readily separated from the sulphonamides by extraction with water or an aqueous solution. The mixtures, however, have utility in various arts.

In a further alternative form of this invention wherein non-volatile polyamines are used, it has been found practical to dissolve the organic sulphonyl chlorides in an inert solvent or diluent and to run this into the liquid or liquefiable polyamine. The reactivity of the polyamines varies and while the lower aliphatic diamines such as ethylene diamine-1,2 and propylene diamine-1,2 and 1,3 react fairly vigorously even at low temperatures with the hydrocarbon sulphonyl chloride mixtures, especially essentially the hydrocarbon monosulphonyl chlorides of this invention, others such as hexamethylene tetramine, the higher aliphatic diamines, e. g. and aromatic diamines, e. g. phenylene diamine-1,4, phenylene diamine-1,3, react somewhat slowly at room temperatures. If the reaction mass is heated to moderate temperatures e. g. 40° to 100° C., the reaction may be induced to run at a fairly reasonable rate.

Another alternative procedure which may be availed of is to use as a condensing medium a polar solvent such as acetic acid to which has been added anhydrous sodium acetate. This method is of particular value as applied to the reaction of aromatic, poly and diamines with the hereindescribed organic sulphonyl halides.

Still another method which may be employed is to heat a liquid amine with admixed hydrocarbon sulphonyl chloride mixtures in the absence of solvents. This process is especially useful for the production of monoamides by the procedures discussed above.

Useful methods for producing hydrocarbon sulphonyl chloride mixtures predominating in hydrocarbon monosulphonyl chlorides are set forth in Henke, application Serial No. 295,695, filed September 19, 1939, and it is to be understood that each of the specific sulphonyl chloride derivative mixtures described therein can be used as reactants in the present process. The hydrocarbon sulphonyl chlorides can be separated from the unreacted hydrocarbons by extraction with a selective solvent for the former such as liquid sulphur dioxide, however, the presence of unreacted hydrocarbon does not seriously interfere with the amidation reaction. The hydrocarbon mono sulphonyl chlorides can be recovered from the extract by allowing the liquid sulphur dioxide to evaporate. Suitable specific extraction procedures are described in Henke and Schofield application, Serial No. 295,694, filed September 19, 1939, now U. S. Patent No. 2,333,568.

This invention will be further illustrated but is not intended to be limited by the following examples.

EXAMPLE I

One hundred grams of a mixture of cetane sulphonyl chloride (analysis chlorine 23.65, S. 12.21%) obtainable by reacting 500 g. of cetane with a gaseous mixture of 1799 g. of sulphur dioxide and 403 g. of chlorine over a period of six hours at 70–85° C. while irradiating with actinic light until a weight gain of 425 g. was obtained, and 72 grams of ethylene diamine were stirred in a water bath at 35° to 40° C. for 4 hours. The viscous oil was then stirred with two 500 cc. portions of water and then dried under vacuum on a steam bath. The oil is soluble in alcohol and acetone and is insoluble in water. It is easily soluble in acids as well as in strong alkaline solutions such as sodium hydroxide solutions.

EXAMPLE II

Three hundred parts of cetane was reacted with a gaseous mixture of 150 parts of sulphur dioxide and 54 parts of chlorine over a period of 30 minutes at a temperature of 45 to 50° C. while being irradiated by light from a 60 watt incandescent tungsten filament electric light bulb until a gain in weight of 61 parts was obtained. The cetane sulphonyl chlorides were recovered from the reaction mixture by extraction by means of liquid sulphur dioxide and subsequent evaporation of the latter. 100 parts of the mixture which consisted essentially of cetane monosulphonyl chlorides and not more than 1% of chloro cetane sulphonyl chlorides was reacted with 90 parts of propylene diamine-1,3 in the same manner as described in the preceding example.

EXAMPLE III

One hundred parts of the mixture containing cetane monosulphonyl chlorides set forth in the preceding example are reacted with 100 parts of 1,4-diaminobenzene dissolved in 300 parts of benzene while warming the reaction vessel to reflux for 4 hours on a steam bath with stirring. The hydrochloride of the diaminobenezene is filtered off and the benzene solution is washed with water containing a small amount of hydrochloric acid. The benzene solution is then evaporated on a water bath and a thick brown paste is obtained.

EXAMPLE IV

Fifteen hundred grams of refined paraffin wax (melting point 124–126° F.) were treated with a gaseous mixture of 671 g. of sulphur dioxide and 537 g. of chlorine at 60–70° and a weight gain of 502 g. was made. The reaction was irradiated with the light from a 150 watt General Electric projector-flood lamp. Air was blown through the reaction mass for thirty minutes to remove the dissolved gases. The mixture was then cooled to 0° C. and filtered on a jacketed Buchner filter at 0° C. The weight of the filtrate was 1073 g. Then 593 g. of the filtrate was extracted with two 1000 cc. portions of liquid sulphur dioxide. The sulphur dioxide was evaporated. 362 g. of paraffin wax sulphonyl chloride was obtained. 135 parts of the paraffin wax sulphonyl chloride were dissolved in 300 parts of benzene and added dropwise while stirring to 90 parts of propylene diamine (88% purity) diluted with 300 parts of benzene at a temperature of 1–3° C. After 12 hours the benzene layer was separated from a viscous material that had settled to the bottom of the flask. The benzene was distilled off and the oily residue was further heated at 70° C. under reduced pressure until foaming subsided. The yield was 151 parts or 95.6% theory. The new compound is insoluble in water but very soluble in acids, organic solvents such as alcohol, acetone and benzene. It is also soluble in strong alkalies. The compound is the mono-amide of a structure as follows:

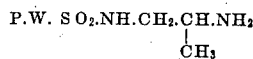

or

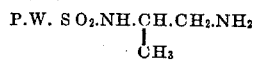

wherein P.W. is the paraffin wax hydrocarbon nucleus. The paraffin wax used consists mainly of paraffin hydrocarbons of a chain length of 24 carbon atoms.

EXAMPLE V

*Di-paraffin wax sulphonyl ethylenediamide*

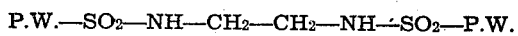

Ten parts of ethylenediamine (80% pure) were mixed with 150 parts of methyl alcohol. To the solution were added while stirring at 45-50° C. 46 parts of paraffin wax mono sulphonyl chlorides free of unsulphonated paraffin wax (obtainable by the method of Example IV). After heating for ½ hour at 50° C. the mixture was cooled down and the crystalline ethylenediamine hydrochloride filtered off. The methyl alcohol solution was evaporated on a boiling water bath. The residue consisting of the di-P.W.-sulphonyl ethylene diamide is a very viscous amber colored product. It is insoluble in water and diluted acids but easily soluble in strong and weak alkalies, such as sodium hydroxide solution, ammonia water, soda ash solutions, pyridine, ethanolamine, etc. The salt of organic or inorganic bases is neutral to phenolphthalein. They have all the characteristics of surface active compounds. The diamide is also soluble in organic solvents such as alcohols, ether, benzene, acetone, etc.

EXAMPLE VI

Fifteen hundred grams of refined paraffin wax (melting point 124-126° F.) was treated with a gaseous mixture of 671 g. of sulphur dioxide and 537 g. of chlorine at 60-70° and a weight gain of 502 g. was made. The reaction was irradiated with the light from a 150 watt General Electric projector-flood lamp. Air was blown through the reaction mass for thirty minutes to remove the dissolved gases. The mixture was then cooled to 0° C. and filtered on a jacketed Buchner filter at 0° C. The weight of the filtrate was 1073 g. Then 593 g. of the filtrate was extracted with two 1000 cc. portions of liquid sulphur dioxide. The sulphur dioxide was evaporated. 362 g. of paraffin wax sulphonyl chloride was obtained, from which one hundred and fifty parts were removed, and were reacted with 90 parts of ethylene diamine (77% purity) under exactly the same conditions as described in Example I. The yield was 160 parts or 93.8% of theory. The product is very similar in appearance and properties to the corresponding propylene diamine derivative. It forms neutral salts with acids. It is soluble in organic solvents such as alcohol, benzene, ethyl acetate, acetone, etc. It is also soluble in strong alkalies.

The mixtures of hydrocarbon sulphonyl chlorides described in the above examples are representative of many other equivalent mixtures which could be used. Thus, in place of the specific sulphonyl chloride reactants mentioned can be substituted others obtainable by reacting saturated aliphatic gaseous, liquid or solid hydrocarbons with admixed sulphur dioxide and chlorine while irradiating the reaction zone with short waved light in such a manner that monosulphonyl chlorides are formed to the substantial exclusion of other products. Practical procedures are described in Henke application, Serial No. 295,695, filed September 19, 1939, and may be recovered by extraction with liquid sulphur dioxide after the manner described in Henke and Schofield application, Serial No. 295,694, filed September 19, 1939, now U. S. Patent No. 2,333,568.

In place of the specific diamines set forth in the preceding examples can be substituted 1:4 diamino anthraquinone, 1:4 di(methylimido) anthraquinone, hexamethylene tetramine, tetramethylene diamine, monomethyl ethylene diamine, symmetrical dimethyl ethylene diamine, unsymmetrical dimethyl ethylene diamine, 1:3 diamino propane, o-phenylene diamine, 1:12 diamino dodecane, 2:6 diamino-2:6 dimethyl heptanol-4, 2:6 diamino-2:6 dimethyl heptanone-4, 1:11 diamino undecane, 1:4 diamino butene-2, toluylene-2:4-diamine, 1:8 diamino naphthalene, 2:4 diaminoanisole, 2:4 diamino phenol, 1:3 diaminopropanol-2, 2:5 diamino toluene, 2:5 diamino chlorobenzene, 2:4 diaminodiphenylamine, 1:4 diamino diphenylmethane, diaminostilbene, triaminopropane, 1:3:5 triaminobenzene, 2:4:6 triaminotoluene.

The organic sulphonamides produced by this invention are useful as plasticizers or intermediates for plasticizers; for various cellulose derivatives, resins, etc. e. g. ethyl and methyl cellulose, cellulose acetate, cellulose glycollate, nitrocellulose, polyvinyl esters, e. g. polyvinyl choride, poyvinyl alcohol, polymeric acrylic and methacrylic acid esters, etc. They have surface activity in strongly alkaline and acid media and may be of value as spreading agents for insecticides. They are of interest as intermediates for the preparation of insecticides. Other uses include gasoline chemical intermediates and intermediates for water-proofing agents. The chief advantages of these amides are their cheapness, ease of preparation and their stability.

This application is a continuation-in-part of my copending application, Serial No. 246,903, filed December 20, 1938, now U. S. Patent 2,334,186.

As many apparently widely different embodiments of this invention may be made without departing from the spirit and scope thereof, it is to be understood that I do not limit myself to the specific embodiments hereof except as defined in the appended claims.

I claim:

1. The process of making organic sulphonamides which comprises reacting a polyamine having at least two unsubstituted amino groups, in the substantial absence of water, with a mixture of saturated aliphatic hydrocarbon sulphonyl chlorides having at least 8 carbon atoms consisting of primary and secondary hydrocarbon monosulphonyl chlorides, chlorohydrocarbon monosulphonyl chlorides, hydrocarbon polysulphonyl chlorides and chlorohydrocarbon polysulphonyl chlorides, obtained by reacting an alkane hydrocarbon of at least 8 carbon atoms with admixed sulphur dioxide and chlorine while irradiating the reaction zone with actinic light.

2. The process of making organic sulphonamides which comprises reacting an aliphatic diamine in the substantial absence of water with a mixture of saturated aliphatic hydrocarbon sulphonyl chlorides having at least 8 carbon atoms consisting of primary and secondary hydrocarbon monosulphonyl chlorides, chlorohydrocarbon monosulphonyl chlorides, hydrocarbon polysulphonyl chlorides and chlorohydrocarbon polysulphonyl chlorides, obtained by reacting an alkane hydrocarbon of at least 8 carbon atoms with admixed sulphur dioxide and chlorine while irradiating the reaction zone with actinic light.

3. The process of making organic sulphonamides which comprises reacting a mol of a polyamine having at least two unsubstituted amino groups, in the substantial absence of water, with at least one mol of a mixture of saturated aliphatic hydrocarbon sulphonyl chlorides having at least 8 carbon atoms consisting of primary and secondary hydrocarbon monosulphonyl chlorides, chlorohydrocarbon monosulphonyl chlorides, hydrocarbon polysulphonyl chlorides and chlorohydrocarbon polysulphonyl chlorides, obtained by reacting an alkane hydrocarbon of at least 8 carbon atoms with admixed sulphur dioxide and chlorine while irradiating the reaction zone with actinic light.

4. The process of making organic sulphonamides which comprises reacting at least three mols of a polyamine having at least two unsubstituted amino groups, in the substantial absence of water, with one mol of a mixture of saturated aliphatic hydrocarbon sulphonyl chlorides having at least 8 carbon atoms consisting of primary and secondary hydrocarbon monosulphonyl chlorides, chlorohydrocarbon monosulphonyl chlorides, hydrocarbon polysulphonyl chlorides and chlorohydrocarbon polysulphonyl chlorides, obtained by reacting an alkane hydrocarbon of sulphur dioxide and chlorine while irradiating the reaction zone with actinic light.

5. An aliphatic sulphonamide of at least 8 carbons atoms containing free amino groups obtained by reacting at least three mols of a polyamine having at least two unsubstituted amino groups, in the substantial absence of water, with one mol of a mixture of saturated aliphatic hydrocarbon sulphonyl chlorides having at least 8 carbon atoms consisting of primary and secondary hydrocarbon monosulphonyl chlorides, chlorohydrocarbon monosulphonyl chlorides, hydrocarbon polysulphonyl chlorides and chlorohydrocarbon polysulphonyl chlorides, obtained by reacting an alkane hydrocarbon of sulphur dioxide and chlorine while irradiating the reaction zone with actinic light.

ARTHUR L. FOX.